United States Patent
Abe et al.

(10) Patent No.: US 6,497,958 B1
(45) Date of Patent: Dec. 24, 2002

(54) COATING COMPOSITION AND METHOD PREPARATION THEREOF

(75) Inventors: Takashi Abe, Tokuyama (JP); Kenichiro Kanou, Tokuyama (JP)

(73) Assignee: Tokuyama Corporation, Yamaguchi (JP)

( * ) Notice: Subject to any disclaimer, the term of this patent is extended or adjusted under 35 U.S.C. 154(b) by 0 days.

(21) Appl. No.: 09/890,592

(22) PCT Filed: Dec. 5, 2000

(86) PCT No.: PCT/JP00/08606

§ 371 (c)(1),
(2), (4) Date: Sep. 28, 2001

(87) PCT Pub. No.: WO01/42381

PCT Pub. Date: Jun. 14, 2001

(30) Foreign Application Priority Data

Dec. 6, 1999 (JP) ............................................. 11-346673

(51) Int. Cl.[7] ................................................. B32B 9/04
(52) U.S. Cl. .................... 428/411.1; 524/430; 428/412; 428/423.1; 428/423.5; 428/423.7; 428/426
(58) Field of Search .............................. 428/412, 411.1, 428/423.1, 423.5, 423.7, 426; 524/430

(56) References Cited

FOREIGN PATENT DOCUMENTS

| EP | 748768 | * | 12/1996 |
| JP | 4220468 | * | 8/1992 |
| JP | 9227830 | * | 9/1997 |

* cited by examiner

Primary Examiner—Terressa M. Boykin
(74) Attorney, Agent, or Firm—Sherman & Shalloway

(57) ABSTRACT

A highly refractive coating composition which can be stably preserved without losing the initial properties even after preserved for extended periods of time. The coating composition contains a metal oxide, a polymerizable alkoxysilane compound, a polymerization catalyst, an acidic aqueous solution and a solvent, wherein an organoamine compound is contained in an amount of from 0.05 to 1.3% by weight with respect to the metal oxide. A method of producing the coating composition comprises mixing a metal oxide suspension containing an organoamine compound in an amount of not smaller than 1.3% by weight with respect to the metal oxide, a polymerizable alkoxysilane compound, a polymerization catalyst, an acidic aqueous solution and a solvent, wherein the organoamine compound is removed so that the amount thereof is from 0.05 to 1.3% by weight with respect to the metal oxide contained in said metal oxide suspension.

4 Claims, No Drawings

COATING COMPOSITION AND METHOD PREPARATION THEREOF

BACKGROUND ART

The present invention relates to a coating composition for forming a transparent film on the surfaces of plastic lenses, the transparent film exhibiting excellent abrasion resistance, resistance against chemicals and weather-proof property, and to a method of producing the same.

Owing to their features such as small weight, safety, easy machinability and fashionableness which are not found in the glass lenses, plastic lenses have been widely used in recent years. However, a diethylene glycol bisallyl carbonate resin lens that is generally used has a refractive index of 1.50 which is smaller than that of the glass, and the outer circumference of the lens tends to become thick. In the field of plastic lenses, therefore, efforts have been made to reduce the thickness by developing highly refractive plastic lenses.

The plastic lenses, however, are subject to be easily scratched and it is a widely accepted practice to apply a silicone coating film onto the surfaces of the plastic lenses. The silicone coating film is usually formed by applying a coating composition (hereinafter also referred to as lowly refractive coating composition) comprising chiefly a fine silica powder, a polymerizable organosilane compound, a polymerizing catalyst, an acidic aqueous solution and a solvent onto the surfaces of the plastic lenses, followed by heating to cure the composition and to vaporize the solvent as disclosed in, for example, Japanese Examined Patent Publication (Kokoku) No. 2735/1982.

When a highly refractive plastic lens having a refractive index of not smaller than 1.54 is coated with a lowly refractive coating composition, however, there occur interference stripes due to a difference in the refractive index between the plastic lens and the coated film deteriorating the appearance.

In order to solve this problem, Japanese Unexamined Patent Publication (Kokai) No. 264805/1993 discloses a coating composition in which a fine silica powder which is a component of the coating composition is substituted by a composite metal oxide such as of Sb, Ti, Zr or Sn having a highly refractive index. Further, Japanese Unexamined Patent Publication (Kokai) No. 245523/1998 discloses a coating composition using a composite metal oxide such as of Ti, Ce or Sn, and Japanese Unexamined Patent Publication (Kokai) No. 306258/1998 teaches a coating composition using a composite metal oxide of Ti, Sn or Zr. Moreover, Japanese Patent No. 2577486, discloses a coating composition using a metal oxide which is an oxide of tungsten coated with a tin oxide. A coating composition using a metal oxide having a refractive index higher than that of the fine silica powder is hereinafter referred to as highly refractive coating composition.

When preserved for extended periods of time, however, the above highly refractive coating composition no longer exhibits the initial property of the coated film due probably to that the initial composition changes by the reaction among the components in the composition while being preserved.

DISCLOSURE OF THE INVENTION

It is an object of the present invention to provide a highly refractive coating composition which can be stably preserved without losing the initial properties even after preserved for extended periods of time.

In order to solve problems inherent in the prior art, the present inventors have conducted keen study and have discovered the fact that the preservation stability is affected by an organoamine compound which is contained as a dispersant in a metal oxide suspension that is a starting material and is, hence, inevitably contained in the conventional highly refractive coating composition. A further study revealed that upon suppressing the content of the organoamine compound within a particular range, preservation stability of the coating composition could be markedly improved, and the inventors have thus completed the invention.

That is, the present invention is concerned with a coating composition containing a metal oxide, a polymerizable alkoxysilane compound, a polymerization catalyst, an acidic aqueous solution and a solvent, wherein an organoamine compound is contained in an amount of from 0.05 to 1.3% by weight with respect to the metal oxide.

The invention is further concerned with a method of producing a coating composition by mixing a metal oxide suspension containing an organoamine compound in an amount of not smaller than 1.3% by weight with respect to the metal oxide, a polymerizable alkoxysilane compound, a polymerization catalyst, an acidic aqueous solution and a solvent, wherein the organoamine compound is removed so that the amount thereof is from 0.05 to 1.3% by weight with respect to the metal oxide contained in said metal oxide suspension.

In the above production method of the invention, the organoamine compound is favorably removed by bringing the metal oxide suspension containing the organoamine compound in an amount of not smaller than 1.3% by weight with respect to the metal oxide into contact with a cation exchanger, or by bringing a mixture of said metal oxide suspension and at least one of other components into contact with the cation-exchange member.

BEST MODE FOR CARRYING OUT THE INVENTION

The coating composition of the invention contains a metal oxide, a polymerizable alkoxysilane compound, a polymerization catalyst, an acidic aqueous solution and a solvent.

There is no particular limitation on the metal oxide used for the coating composition of the present invention provided it is an oxide of a metal. There can be used any known metal oxide that: has heretofore been used for the lowly refractive or highly refractive coating compositions. Among these metal oxides, it is desired to use oxides of one or two or more kinds of metals selected from Al, Ti, Fe, In, Zr, Au, Ag, Sn, Sb, W and Ce, or a metal oxide containing composite oxides of these metals and, particularly, to use oxides of at least one or two or more kinds of metals selected from Al, Ti, Fe, Zr, Sn, Sb and W from the standpoint of abrasion resistance and large refractive index of the obtained coated film. It is also allowable to use these metal oxides in combination with silicon dioxide from the standpoint of adjusting the refractive index. In this case, the blending amount may be determined depending upon a desired refractive index of the coated film.

Though there is no particular limitation, it is desired that the metal oxide used in the present invention has an average particle diameter of from 1 to 300 nm so will not to impair the transparency of the obtained coated film. The metal oxide having such particle diameters is usually used being dispersed in a dispersing medium such as water, alcohol or any other organic solvent just like in the conventional coating composition. Generally, the metal oxide is colloidally dispersed to prevent the particles from being coagulated.

The amount of the metal oxide blended in the coating composition of the present invention is suitably determined depending upon the kind of the metal oxide and use of the coated film that is finally obtained, and is desirably from 20 to 70% by weight of the weight (mass) of the coated film that is finally formed. When the blending amount of the metal oxide on the above basis is smaller than 20% by weight, the coated film fails to exhibit abrasion resistance to a sufficient degree. When the blending amount exceeds 70% by weight, the coated film tends to be cracked. The weight of the coated film that is finally formed is substantially the weight of the metal oxide plus the weight of the polymerizable alkoxysilane compound that is polymerized and condensed as will be described later.

As the polymerizable alkoxysilane compound used for the coating composition of the present invention, there can be used, without limitation, any known alkoxysilane compound that has heretofore been used in the lowly refractive and highly refractive coating compositions as taught in, for example, Japanese Examined Patent Publication (Kokoku) N. 38419/1989 and Japanese Unexamined Patent Publication (Kokai) No. 116843/1999.

Concrete examples of the alkoxysilane compound include vinyltrimethoxysilane, vinyltriethoxysilane, vinyltriacetoxysilane, vinyldimethoxyethoxysilane, γ-glycidoxypropyltrimethoxysilane, γ-glycidoxypropylmethyldimethoxysilane, γ-methacryloxypropyltrimethoxysilane, γ-mercaptopropyltrimethoxysilane, β-(3,4-epoxycyclohexyl)ethytrimethoxysilane, γ-aminopropyltriethoxysilane, allyltrialkoxysilane, and acryloxypropyltrialkoxysilane, which may be partly or entirely hydrolyzed or may be partly condensed.

Among them, from the standpoint of adhesive to the lens and crosslinking property, it is desired to use γ-glycidoxypropyltrimethoxysilane, γ-glycidoxypropylmethyldimethoxysilane, as well as a partly hydrolyzed product thereof or a partly condensed product thereof. The above alkoxysilane compounds may be used in one kind only or in plural kinds in combination.

In the coating composition of the present invention, it is desired that the polymerizable alkoxysilane compound is used in a form of at least partly hydrolyzed by being mixed with an acidic aqueous solution in advance or in a form in which the hydrolyzed product is partly condensed from the standpoint of improving the coating property.

It is desired that the coating composition of the present invention is blended with the alkoxysilane in an amount of from 30 to 80% by weight per the total weight of the coated film that is finally formed.

When the amount is smaller than 30% by weight, the coated film is often cracked. When the amount exceeds 80% by weight, on the other hand, the coated film fails to exhibit abrasion resistance to a sufficient degree.

The polymerization catalyst used for the coating composition of the present invention may be the one capable of polymerizing the above polymerizable organic silane compound. There can be used, without limitation, any known polymerization catalyst used for the conventional lowly refractive and highly refractive coating compositions as taught in Japanese Examined Patent Publications (Kokoku) Nos. 2735/1982 and 50774/1991.

Concrete examples of the polymerization catalyst include perchlorates such as magnesium perchlorate, aluminum perchlorate, zinc perchlorate and ammonium perchlorate; metal acetylacetonates such as aluminum acetylacetonate, indium acetylacetonate, chromium acetylacetonate, nickel acetylacetonate, titanium acetylacetonate, cobalt acetylacetonate and copper acetylacetonate; organometal salts such as sodium acetate, zinc naphthenate, cobalt naphthenate and zinc octylate; and Lewis acids such as stannic chloride, aluminum chloride, ferric chloride, titanium chloride, zinc chloride and antimony chloride. In particular, there can be preferably used magnesium perchlorate and aluminum acetylacetonate.

Though there is no particular limitation, it is desired that the polymerization catalyst is blended in an amount of from 0.01 to 5.0 parts by weight and, particularly, from 0.1 to 3.0 parts by weight per 100 parts by weight of the polymerizable alkoxysilane compound.

As the acidic aqueous solution used for the coating composition of the invention, any known acid can be used without limitation provided it is capable of hydrolyzing and condensing the alkoxysilane compound. Examples of the above acid include inorganic acids such as hydrochloric acid, sulfuric acid, nitric acid and phosphoric acid; and organic acids such as acetic acid and propionic acid. Among them, it is desired to use hydrochloric acid from the standpoint of preservation stability of the coating composition and hydrolyzing property. Desirably, the hydrochloric acid aqueous solution has a concentration of from 0.01 N to 5 N. It is desired that the amount of water in the acidic aqueous solution is from 0.1 to 3 times as great mole number as the total mol number of the alkoxyl groups finally hydrolyzed in the polymerizable alkoxysilane compound.

Any known solvent can be used for the coating composition of the present invention provided it is capable of dissolving the above-mentioned polymerizable alkoxysilane compound, capable of dispersing the metal oxide in a fine particulate state, and has a volatile property. Examples of the solvent include alcohols having 1 to 4 carbon atoms, such as methanol, ethanol, propanol, isopropanol and butanol-; lower alcohol esters such as methyl acetate, ethyl acetate and propyl acetate; ethers such as cellosolve and dioxane; ketones such as acetone; halogenated hydrocarbons such as methylene chloride; and aromatic hydrocarbons such as benzene and toluene. These solvents may be used alone or being mixed in two or more kinds together.

Among these solvents, it is particularly desired to use methanol, isopropahol, t-butyl alcohol and dioxane from the standpoint of dissolving a hydrochloric acid aqueous solution used as an acid, easy vaporization at the time of forming the coated film and smoothly forming the coated film.

Though there is no particular limitation, it is desired to use the solvent in an amount of from 100 parts by weight to 2000 parts by weight and, particularly, from 300 to 1000 parts by weight per 100 parts by weight of the coated film that is finally formed.

The coating composition of the present invention may contain one or two or more additives selected from surfactant, ultraviolet ray-absorbing agent, antioxidant, antistatic agent, dye, pigment, fluorescent dye, photochromic compound, or weather-proof stabilizers such as hindered amines or hindered phenols in addition to the above-mentioned essential components.

The pigments and dyes used for the coating composition of the present invention may be those of either the organic ones or inorganic ones provided they dissolve or disperse homogeneously in the coating composition. As the organic solvent, there can be used azo pigment, anthraquinone pigment, phthalocyanine pigment, naphthalocyanine pigment, quinacridone pigment, dioxazine pigment, indigoid pigment, triphenyl pigment, and xanthene pigment. As the inorganic pigment, there can be used a cobalt blue pigment and ultramarine. As the dye, there can be used hitroso dye, nitro dye, azo dye, stilbeneazo dye, ketoimine dye, triphenylmethane dye, xanthene dye, acridine dye, quinoline dye, methine dye, polymethine dye, thiazole dye, indamine die, indophenol dye, azine dye, oxazine dye, thiazine dye, sulfur dye, aminoketone dye, oxyketone dye, anthraquinone dye, indigoid dye and phthalocyanine dye.

In the conventional coating composition as described above, fine particles of the metal oxide colloidally dispersed in a dispersing medium such as water, alcohol or any other organic solvent (hereinafter also referred to simply as colloidal solution) is used as a metal oxide. Usually, the colloidal solution that is available contains an organic amine compound as a dispersing agent for the metal oxide fine particles in an amount of about 2% by weight of the metal oxide. The conventional coating composition is used by passing the colloidal solution through a simple treatment such as filter and, hence, inevitably contains the organoamine compound in amounts of 2% by weight on the basis of the metal oxide.

In the coating composition of the present invention, on the other hand, the amount of the organoamine compound is suppressed to be from 0.05 to 1.3% by weight with respect to the weight of the metal oxide as will be described later in detail with reference to the method of production.

Upon suppressing the amount of the organoamine compound to lie within the above-mentioned range, it is allowed to lengthen the preservation term, and the coated film exhibits a high durability equivalent to that of when the coating composition is cured over extended periods of time. From the standpoint of maintaining a high preservation stability, it is desired that the content of the organic amine is from 0.05 to 1.3% by weight and, particularly from 0.1 to 1.0% by weight with respect to the metal oxide.

The organoamine compound of the present invention is an amine compound that can be used as a dispersant in a colloidal solution. Concrete examples of this compound include alkylamines such as ethylamine, triethylamine, n-propylamine and isopropylamine; aralkylamines such as benzylamine; alicyclic amines such as piperidine; and alkanolamines such as monoethanolamine and triethanolamine.

Though there is no particular limitation, the coating composition according to the present invention is preferably produced according to a method described below.

That is, the coating composition is favorably produced by mixing a metal oxide suspension containing an organoamine compound in an amount of not smaller than 1.3% by weight with respect to a metal oxide, an alkoxysilane compound, a polymerization catalyst, an acidic aqueous solution and a solvent, wherein the organoamine compound is removed so that the amount thereof is from 0.05 to 1.3% by weight with respect to the metal oxide contained in the colloidal solution.

In the above-mentioned production method, there is no particular limitation on removing the organoamine compound, and it is desired to bring the colloidal solution into contact with an organoamine-treating agent, or to bring a mixture of the colloidal solution and at least one of any other component into contact with the organoamine-treating agent.

Here, the organoamine-removing agent may be a cation exchanger such as cation-exchange resin or cation-exchange membrane; or a removing agent such as silica gel, alumina, zeolite, aluminosilicagel, molecular sieve or activated carbon. Among these organoamine-removing agents, it is desired to use a cation exchange member and, particularly, a cation exchange resin from the standpoint of obtaining a high organoamine-removing efficiency and easily separating the organoamine-removing agent.

In removing the organoamine compound by using the organoamine-removing agent in the production method of the present invention, the organic amine compound may be removed at any step while producing the coating composition by mixing all of the essential components. It is, however, desired to remove the organoamine compound after the colloidal solution has been mixed with the solvent from the standpoint of preventing the fine metal oxide powder from being coagulated and preventing the reaction that takes place when the organoamine-removing agent comes into contact with the organosilane compound.

The amount of the organoamine-removing agent used here varies depending upon the kind and amount of the organoamine compound that is contained and upon the kind of the removing agent, and cannot be definitely determined. The amount of the organoamine-removing agent should be suitably determined by conducting experiment in advance to examine a relationship between the amount of the removing agent and the amount the organoamine compound that is removed for each of the systems, and based on the relationship that is found.

The organoamine compound can be removed by any method of bringing the organoamine-removing agent into contact with the organoamine in the colloidal solution or in the mixture solution by adding the organoamine-removing agent to the colloidal solution or to the mixture of the colloidal solution and at least one of any other component, followed by stirring, or by passing the mixture solution through a column filled with the organoamine-removing agent. When the organoamine-removing agent is added and stirred, the organoamine-removing agent after the treatment may be isolated and removed by filtering or the like.

The colloidal solution or the mixture of the colloidal solution and other component from which the organoamine compound has been removed is mixed with other components (any one of alkoxysilane compound, acidic aqueous solution, polymerization catalyst or solvent that is lacking) necessary for constituting the coating composition, thereby to prepare a coating solution of the present invention.

The thus produced coating composition of the present invention is, as required, filtered to remove foreign matters, and is applied onto the surfaces of a base member such as of plastic lenses, and is dried and cured to form a coated film.

The coated film formed of a coating composition of the present invention containing a metal oxide such as of Al, Ti, Fe, In, Zr, Au, Ag, Sn, Sb, W or Ce or a composite oxide thereof, exhibits a high refractive index and can be used as a variety kinds of reflection-preventing coatings.

In applying the coating composition of the present invention, it is recommended to subject the surfaces of the base member to the treatment with an alkali, treatment with an acid, polishing, treatment with a plasma or primer treatment in order to improve intimate adhesion between the base member and the coated film.

As the base member to be coated with the coating composition of the present invention, there can be exemplified various spectacle lenses, camera lenses, liquid crystal displays, windowpanes for automobiles, plastic panels and the like optical articles made of a highly refractive urethane resin, a highly refractive allylcarbonate resin, a (meth) acrylate resin, a diethyleneglycolbisallyl carbonate homo- or copolymer, a diallylphthalate resin, a polycarbonate resin, a polystyrene resin, a polyvinyl chloride, a polyethylene terephthalate, a polysulfone resin or a glass. The interference stripes do not appear even when the coating composition is applied onto the highly refractive spectacle lenses of an urethane resin having a refractive index of not smaller than 1.54 obtained by the polymerization of, for example, a thiol compound and an isocyanate compound. Therefore, an improved abrasion resistance is imparted without deteriorating aesthetic nature.

The above method of the present invention can be used without any particular limitation for applying the coating composition of the present invention onto the surfaces of base members of the above-mentioned plastic molded articles. For example, there is usually employed a method of immersing the molded article in a solution of the coating composition or a method of applying the solution by spraying, by using a brush or by using a roller.

After applied, the coating composition is dried in the dry air or in the air, and is heat-treated so as to be cured thereby to form a coated film. The heating temperature may vary depending upon the base material but is usually not lower than 80° C. and, preferably, not lower than 100° C. up to a temperature at which the base member is not deformed and, usually, not higher than 150° C. The curing time is roughly 2 hours at 130° C. and about 2 to about 5 hours at 100 to 120° C. The coated film that is formed by being cured may have a thickness of from about 0.1 to about 50 $\mu$m. When applied to the spectacle lenses, however, the coated film has a thickness of, particularly desirably, from 1 to 10 $\mu$m.

EXAMPLES

The invention will now be described in further detail by way of Examples to which only, however, the invention is in no way limited.

Example 1

(1) Preparation of a Coating Composition.

First, 493 g of an isopropyl alcohol, 986 g of a t-butyl alcohol and 1000 g of a titanium oxide/tin oxide/zirconium oxide composite sol dispersed in methanol (metal oxide concentration of 30% by weight, average particle diameter of metal oxide of 10 nm, manufactured by Nissan Chemical Industries Co.), were mixed together and to which was added 15 g of a cation-exchange resin (Dowex HCR-S). The mixture was then stirred for one hour and filtered to separate the cation-exchange resin.

Analysis of the above sol indicated the amount of the organoamine compound to be 1.7% by weight with respect to the metal oxides. The amount of the organoamine compound was determined by a gas chromatography having a FID detector using a glass column of 3 m×3.2 mm filled with a carrier (Ami-Pack 131 manufactured by G.L. Science Co.). The measuring conditions consisted of a column temperature of 100° C., injection and detector temperature of 180° C., and a sample pouring amount of one microliter. The filtrate was similarly analyzed and it was found that the amount of the organoamine compound was 0.2% by weight with respect to the metal oxides.

The above mixture was filtered through a filter of one micron, and 424 g of a γ-glycidoxypropyltrimethoxysilane was mixed into the filtrate thereof to prepare a mixture solution. To the thus obtained mixture solution was dropwisely added 97 g of a 0.05 N hydrochloric acid aqueous solution. The mixture was then stirred for 2 hours, and to which were added 3 g of an aluminum acetylacetonate and 1.5 of a silicone surfactant (trade name: L-7001, manufactured by Nippon Unicar Co.). The mixture was ripened a whole day to obtain a coating composition of the present invention.

(2) Formation of a Coated Film.

An urethane lens having a refractive index of 1.60 treated with an alkali was immersed in a coating composition obtained in the step (1) above, and was pulled up at a rate of 30 cm a minute to apply the coating composition onto the surfaces of the urethane lens. The applied coating composition was dried at 80° C. for 20 minutes and was cured being maintained at 110° C. for 4 hours to form the coated film.

The thus obtained coated film was colorless and transparent having a thickness of about 2 microns and a refractive index of 1.61, The obtained coated film was evaluated concerning the following items (a) to (d). As a result, the appearance was ○, abrasion resistance was A, resistance against chemicals was good, and adhesiveness was 100/100, Further, the preservation stability of the coating composition was evaluated in a manner as described in (e) below, and favorable results were obtained even after 3 weeks and 5 weeks have passed.

[Items of Measurement]

(a) Appearance

The film was inspected by eyes concerning the transparency, shading and interference stripes. Those exhibiting favorable appearance were evaluated to be ○ and those exhibiting poor appearance were evaluated to be X.

(b) Abrasion Resistance

The surface of the lens was rubbed 10 round tips by using a steel wool (Bonstar #0000 manufactured by Nihon Steel Wool Co.) with a load of 1 kg, and the degree of scarring was evaluated by eyes in three steps. The reference of evaluation was as follows:

A: Almost no scar

B: Slightly scarred

C: Film was peeled off (c) Resistance Against Chemicals

Immersed in acetone for 48 hours, and those that exhibited no change in the appearance were regarded to be the favorable ones.

(d) Adhesiveness

Adhesiveness between the coated film and the lens was examined by the cross-cut tape testing method in compliance with JIS D-0202, That is, by using a cutter knife, the surface of the lens was cut maintaining a gap of about 1 mm to form 100 squares. Then, an adhesive cellophane tape (Celloitape produced by Nichiban Co.) was strongly stuck thereon and was peeled off the surface by pulling it at one time, in a direction of 90 degrees with respect to the surface, and the remaining number of squares of the coated film were counted. The result was evaluated to be (remaining number of squares)/100.

(e) Preservation Stability (Pot Life) of the Coating Composition.

The coating composition that was prepared was preserved at 20° C. for 3 weeks and 5 weeks. By using these preserved compositions the coated films were formed by the same method as the one described above to evaluate the appearance, abrasion resistance and adhesiveness of the coated films. The coated film was regarded to be good when none of these properties has dropped compared with those of the film obtained by using the coating composition of before being preserved. The coating, however, was regarded too be defective when it exhibited a drop in any one or more of these properties.

Example 2

494 Grams of an isopropyl alcohol, 986 g of a t-butyl alcohol, 1000 g of a titanium oxide/tin oxide/zirconium oxide composite sol dispersed in methanol (same as the one used in Example 1), and 423 g of a γ-glycidoxypropyltrimethoxysilane, were mixed together. To the thus obtained mixture solution was then dropwisely added 97 g of a 0.05 N hydrochloric acid aqueous solution. The mixture was then stirred for 2 hours, and to which were added 3 g of an aluminum acetylacetonate and 1.5 g of a silicone surfactant (trade name: L-7001, manufactured by Nippon Unicar Co.). Thereafter, 15 g of a cation-exchange resin (Dowex HCR-S) was added thereto, and the mixture was stirred for one hour, filtered through a filter of one micron, and was then ripened for a whole day to obtain a coating composition of the present invention.

The thus obtained coating composition was measured for its content of the organoamine compound in the same manner as in Example 1, evaluated for its preservation stability, and from which a coated film was formed in the same manner as in Example 1. The coated film possessed a thickness of about 2 microns and a refractive index of 1.61, the film being colorless and transparent. The obtained coated film was evaluated for its properties in the same manner as in Example 1, The results were as shown in Tables 1 to 3.

Table 1 shows the initially evaluated results and the amount of organoamine, Table 2 shows the results of the coating composition after preserved for 3 weeks and evaluated in the same manner as in Example 1, and Table 3 shows the results of the coating composition after preserved for 5 weeks and evaluated in the same manner as in Example 1.

Even in the following Examples and Comparative Examples, Tables 1, 2 and 3 show the results of initial evaluation, results of evaluation after preserved for 3 weeks and the results of evaluation after preserved for 5 weeks respectively.

Example 3

497 Grams of an isopropyl alcohol, 994 g of a t-butyl alcohol, and 1000 g of a titanium oxide/tin oxide/zirconium oxide composite sol dispersed in methanol (same as the one used in Example 1) were mixed together, and to which was added 15 g of a cation-exchange resin (Dowex HCR-S). The mixture was stirred for one hour. The mixture was then filtered through a filter of one micron, and to which were mixed 254 g of a γ-glycidoxypropyltrimethoxysilane and 168 g of a di(methyldiethoxysilyipropyl)carbonate.

To the thus obtained mixture solution was then dropwisely added 87 g of a 0.05 N hydrochloric acid aqueous solution. The mixture was then stirred for 2 hours, and to which were added 3 g of an aluminum acetylacetonate and 1.5 of a silicone surfactant (trade name: L-7001, manufactured by Nippon Unicar Co.). The mixture was ripened for a whole day to obtain a coating composition of the present invention.

The thus obtained coating composition was measured for its content of the organoamine compound in the same manner as in Example 1, evaluated for its preservation stability, and from which a coated film was formed in the same manner as in Example 1, The coated film possessed a thickness of about 2 microns and a refractive index of 1.61, the film being colorless and transparent. The coated film was evaluated for its properties in the same manner as in Example 1. The results were as shown in Tables 1 to 3.

Example 4

429 Grams of an isopropyl alcohol, 858 g of a t-butyl alcohol, 1400 g of a titanium oxide/tin oxide/zirconium oxide composite sol dispersed in methanol (same as the one used in Example 1), and 254 g of a γ-glycidoxypropyltrimethoxysilane, were mixed together. To the thus obtained mixture solution was then dropwisely added 58 g of a 0.05 N hydrochloric acid aqueous solution. The mixture was then stirred for 2 hours, and to which were added 3 g of an aluminum acetylacetonate and 1.5 of a silicone surfactant (trade name: L-7001, manufactured by Nippon Unicar Co.).

Thereafter, 21 g of a cation-exchange resin (Dowex HCR-S) was added thereto, and the mixture was stirred for one hour, filtered through a filter of one micron, and was then ripened for a whole day to obtain a coating composition of the present invention.

The thus obtained coating composition was measured for its content of organoamine compound in the same manner as in Example 1, Further, the film was formed in the same manner as in Example 1 but using an urethane lens having a refractive index of 1.67 treated with an alkali. The film possessed a thickness of about 2 microns and a refractive index of 1.66, the film being colorless and transparent. The coated film was evaluated for its properties and the preservation stability of the coating composition in the same manner as in Example 1, The results were as shown in Tables 1 to 3.

Example 5

494 Grams of an is opropyl alcohol, 986 g of a t-butyl alcohol, and 1000 g of a titanium oxide/tin oxide composite sol dispersed in methanol (a metal oxide concentration of 30% by weight, an average particle diameter of the metal oxide of 15 nm, manufactured by Nissan Chemical Industries Co.) were mixed together, and to which was added 15 g of a cation-exchange resin (Dowex HCR-S). The mixture was stirred for one hour. The mixture was then filter ed through a filter of one micron to separate the cation-exchange resin.

Analysis of the sol in the same manner as in Example 1 indicted the amount of the organoamine compound to be 2% by weight with respect to the metal oxides. Further, the filtrate was analyzed in the same manner to find that the amount of the organoamine compound was 0.2% by weight with respect to the metal oxides.

To the above filtrate was further mixed 423 g of a γ-glycidoxypropyltrimethoxysilane, and to which was further dropwisely added 97 g of a 0.05 N hydrochloric acid aqueous solution. The mixture was then stirred for 2 hours, and to which were added 3 g of an aluminum acetylacetonate and 1.5 of a silicone surfactant (trade name: L-7001, manufactured by Nippon Unicar Co.). The mixture was ripened for a whole day to obtain a coating composition of the present invention.

The thus obtained coating composition was measured for its content of the organoamine compound in the same manner as in Example 1, evaluated for its preservation stability, and from which a coated film was formed in the same manner as in Example 1, The film possessed a thickness of about 2 microns and a refractive index of 1.60, the film being colorless and transparent. The obtained film was evaluated for its properties in the same manner as in Example 1, The results were as shown in Tables 1 to 3.

Example 6

A coating composition of the invention was prepared in the same manner as in Example 1 but using the cation-exchange resin in an amount of 3 g.

The obtained coating composition was measured for its content of the organoamine compound in the same manner as in Example 1, evaluated for its pot life, and from which a coated film was formed in the same manner as in Example 1, The film possessed a thickness of about 2 microns and a refractive index of 1.61, the film being colorless and transparent. The obtained film was evaluated for its properties in the same manner as in Example 1, The results were as shown in Tables 1 to 3.

Example 7

A coating composition of the invention was prepared in the same manner as in Example 1 but using the cation-exchange resin in an amount of 17 g.

The obtained coated composition was measured for its content of the organoamine compound in the same manner as in Example 1, evaluated for its pot life, and from which a coated film was formed in the same manner as in Example 1, The film possessed a thickness of about 2 microns and a refractive index of 1.61, the film being colorless and transparent. The obtained film was evaluated for its properties in the same manner as in Example 1, The results were as shown in Tables 1 to 3.

Example 8

A coating composition of the invention was prepared in the same manner as in Example 1 but using the cation-exchange resin in an amount of 7 g.

The obtained coating composition was measured for its content of the organoamine compound in the same manner as in Example 1, evaluated for its pot life, and from which a coated film was formed in the same manner as in Example 1, The film possessed a thickness of about 2 microns and a refractive index of 1.61, the film being colorless and transparent. The obtained film was evaluated for its properties in the same manner as in Example 1, The results were as shown in Tables 1 to 3.

Comparative Example 1

The procedure was carried out in quite the same manner as in Example 1 but without adding the cation-exchange resin (Dowex HCR-S) and without effecting the filtering.

The obtained coating composition was measured for its content of the organoamine compound in the same manner as in Example 1, evaluated for its preservation stability, and from which a coated film was formed in the same manner as in Example 1 to evaluate it. The results were as shown in Tables 1 to 3.

Comparative Example 2

A coating composition was prepared in the same manner as in Example 1 but using the cation-exchange resin in an mount of 0.15 g.

The obtained coated composition was measured for its content of the organoamine compound in the same manner as in Example 1, evaluated for its preservation stability, and from which a film was formed in the same manner as in Example 1 to evaluate it. The results were as shown in Tables 1 to 3.

Comparative Example 3

A coating composition was prepared in the same manner as in Example 1 but using the cation-exchange resin in an amount of 30 q.

The obtained coating composition was measured for its content of the organoamine compound in the same manner as in Example 1, evaluated for its preservation stability, and from which a film was formed in the same manner as in Example 1 to evaluate it. The results were as shown in Tables 1 to 3.

TABLE 1

| No. | Appearance | Abrasion resistance | Chemical resistance | Adhesiveness | Overall evaluation | Amount of organoamine (% by weight)* |
|---|---|---|---|---|---|---|
| Example 1 | o | A | good | 100/100 | good | 0.2 |
| Example 2 | o | A | good | 100/100 | good | 0.2 |
| Example 3 | o | A | good | 100/100 | good | 0.2 |
| Example 4 | o | A | good | 100/100 | good | 0.2 |
| Example 5 | o | A | good | 100/100 | good | 0.2 |
| Example 6 | o | A | good | 100/100 | good | 1.3 |
| Example 7 | o | A | good | 100/100 | good | 0.05 |
| Example 8 | o | A | good | 100/100 | good | 1.0 |
| Comp. Ex. 1 | o | A | good | 100/100 | good | 1.7 |
| Comp. Ex. 2 | o | A | good | 100/100 | good | 1.5 |
| Comp. Ex. 3 | o | A | good | 100/100 | good | 0.01 |

*With respect to the weight of metal oxides.

TABLE 2

| No. | Appearance | Abrasion resistance | Chemical resistance | Adhesiveness | Overall evaluation |
|---|---|---|---|---|---|
| Example 1 | o | A | good | 100/100 | good |
| Example 2 | o | A | good | 100/100 | good |
| Example 3 | o | A | good | 100/100 | good |
| Example 4 | o | A | good | 100/100 | good |
| Example 5 | o | A | good | 100/100 | good |
| Example 6 | o | A | good | 100/100 | good |
| Example 7 | o | A | good | 100/100 | good |
| Example 8 | o | A | good | 100/100 | good |
| Comp. Ex. 1 | x | C | poor | 25/100 | poor |
| Comp. Ex. 2 | x | C | good | 40/100 | poor |
| Comp. Ex. 3 | x | C | good | 50/100 | poor |

TABLE 3

| No. | Appearance | Abrasion resistance | Chemical resistance | Adhesiveness | Overall evaluation |
|---|---|---|---|---|---|
| Example 1 | ○ | A | good | 100/100 | good |
| Example 2 | ○ | A | good | 100/100 | good |
| Example 3 | ○ | A | good | 100/100 | good |
| Example 4 | ○ | A | good | 100/100 | good |
| Example 5 | ○ | A | good | 100/100 | good |
| Example 6 | x | B | good | 65/100 | poor |
| Example 7 | x | B | good | 70/100 | poor |
| Example 8 | ○ | A | good | 100/100 | good |
| Comp. Ex. 1 | x | C | poor | 0/100 | poor |
| Comp. Ex. 2 | x | C | poor | 25/100 | poor |
| Comp. Ex. 3 | x | C | poor | 30/100 | poor |

Industrial Applicability

As will be understood from Tables 1 to 3, the coating compositions containing the organoamine compound in amounts of not smaller than 1.3% by weight with respect to the metal oxide (Comparative Examples 1 and 2) can be stably preserved for shorter than three weeks (the coating composition becomes defective when preserved for three weeks). In contrast with this, the coating compositions of the present invention can all be stably preserved for more than three weeks.

As described above in detail, the coating compositions of the present invention can be stably preserved for periods of time which are greatly extended compared with that of the existing coating compositions. Even after preserved for long periods of time, therefore, the coating composition of the present invention makes it possible to obtain a coated film exhibiting favorable properties.

According to the production method of the invention, further, the coating composition of the invention exhibiting the above-mentioned excellent features can be easily produced.

What is claimed is:

1. A coating composition containing i) a metal oxide, ii) a polymerizable alkoxysilane compound, iii) a polymerization catalyst selected from the group consisting of a perchlorate, a metal acetylacetonate, an organometal salt and a Lewis acid, iv) an acidic aqueous solution and v) a solvent, wherein at least one organoamine compound which can be used as a dispersant in a colloidal solution of the metal oxide and is selected from the group consisting of an alkylamine, an aralkylamine, an alicyclic amine and an alkanolamine, is contained in an amount of from 0.05 to 1.3% by weight with respect to the metal oxide.

2. A method of producing a coating composition by mixing i) a metal oxide suspension containing at least one organoamine compound which can be used as a dispersant of said suspension and is selected from the group consisting of an alkylamine, an aralkylamine, an alicyclic amine and an alkanolamine in an amount of not smaller than 1.3% by weight with respect to the metal oxide, ii) a polymerizable alkoxysilane compound, iii) a polymerization catalyst selected from the group consisting of a perchlorate, a metal acetylacetonate, an organometal salt and a Lewis acid, iv) an acidic aqueous solution and v) a solvent, wherein the organoamine compound is removed so that the amount thereof is from 0.05 to 1.3% by weight with respect to the metal oxide contained in said metal oxide suspension.

3. A method of producing a coating composition according to claim 2, wherein the organoamine compound is removed by bringing the metal oxide suspension containing the organoamine compound in an amount of not smaller than 1.3% by weight with respect to the metal oxide into contact with a cation exchanger, or by bringing a mixture of said metal oxide suspension and at least one of other components into contact with the cation-exchange member.

4. An optical article having, formed on the surfaces thereof, a film of a cured product of the coating composition of claim 1.

* * * * *